3,396,003
METHOD OF AMMONIATING PHOSPHATE ROCK
Kurt C. Scheel, Lubeck-Danischburg, and Hans Ebsen, Krefeld, Germany, assignors to Guano-Werke Aktiengesellschaft (vorm. Ohlendorff'sche und Merck'sche Werke), Hamburg, Germany
Filed Nov. 13, 1964, Ser. No. 410,960
Claims priority, application Germany, Nov. 15, 1963, G 39,179
5 Claims. (Cl. 71—34)

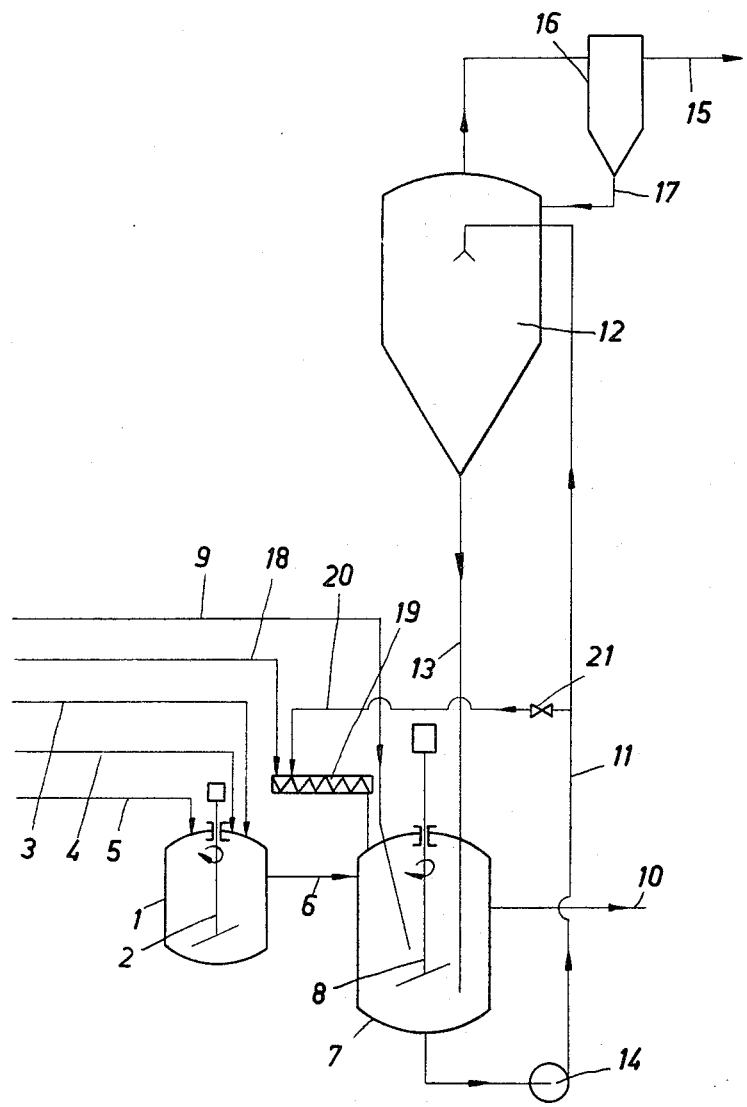

ABSTRACT OF THE DISCLOSURE

Phosphate rock is reacted with nitric or phosphoric acid and the acidulated mixture is ammoniated in a single stage in the presence of a large amount of recycled already ammoniated solution thereby maintaining the pH between 5.5 and 6.8 and preventing thickening and evaporating excess water during neutralization without additional operations.

More particularly, the invention relates to those processes according to which complex fertilizers are made by acidulating phosphate rock with nitric acid and/or phosphoric acid and if desired sulfuric acid, by introducing the resulting solution into reaction material already neutralized, neutralizing with ammonia and, if desirable, by mixing with potassium salts and other additives and by drying and granulating the slurry thus achieved.

Ammoniation is an exothermic process. The resulting high temperatures may be harmful as they favor the formation of phosphate compounds not available to plants and reduce the citrate solubility. Owing to the reaction heat released, which is particularly high if the ammonia is introduced in gaseous form, the slurry gets boiling and consequently a portion of the water vaporizes.

The process described above has been carried out in special plants in which acidulation is followed by a stepwise ammoniation while cooling, thus avoiding temperatures higher than about 70–80° C. In these processes special difficulties arise owing to the circumstance that the mixture undergoes a considerable thickening when the pH rises from pH 1.5 to pH 2.5 and from pH 3.5 to pH 5.5. The slurry gets more liquid again above pH 5.5. However, the process should be performed in such a way that the mixture does not thicken as thickening makes stirring, pumping and other treatments of the mixture impossible or at least difficult.

The invention is based on the recognition that such difficulties can be avoided and that also the optimum of temperature control in the ammoniation step of the process can be attained if the acidulated mixture is introduced into the neutralized slurry, while intensively stirring, and is ammoniated essentially in a single stage (step) at a pH of over 5, preferably 5.5–6.8 and at reaction temperatures between 70° C. and 110° C., preferably 80° C.–100° C. The temperature of the reaction is controlled by removing the heat of reaction released or a portion of it by water evaporation achieved by recycling a portion of the slurry continuously through a vacuum evaporator. The temperature in the ammoniation stage may be controlled by the pressure in the vacuum evaporator and by the portion of the ammoniated slurry recycled through the vacuum evaporator. Potassium salts and other additives may be introduced into the ammoniated slurry as a whole or partly during ammoniation.

According to the process of the invention the ammoniation is performed essentially in a single step in order to utilize a maximum of the reaction heat for water vaporization. This does not exclude that one or more steps of ammoniation may be applied before and/or after evaporation. For example a subsequent ammoniation in order to correct the nitrogen content and for accurate control of pH may be effected after evaporation. For this purpose only smaller amounts of ammonia are necessary, for instance 5–20%, preferably about 10% of the amount of ammonia introduced.

The advantages obtained according to the invention are in particular:

(1) Essential simplification of the installation;
(2) Easy supervision and good control of temperature;
(3) Small reaction space, that is high space/time yield;
(4) Possibility of using automatic circulation through the vacuum evaporator;
(5) Easy adjustment of the reaction temperature also to low temperatures (70–80° C.) by forced circulation effected by a pump. In particular:
   (a) facilitating the absorption of $NH_3$;
   (b) avoidance of a reduction of the citrate solubility of the product;
(6) Considerable improvement of the processability of the fertilizer slurry by essential reduction of the water content, of the viscosity and of the thixotropy.

The drawing illustrates an installation appropriate for the accomplishment of the invention.

Line 3 for feeding phosphate rock, line 4 for nitric acid and line 5 for phosphoric acid are connected to the reaction vessel 1 provided with agitator 2. Vessel 1 is connected to an ammoniation tank 7 being provided with agitator 8. Line 9 terminating within tank 7 is provided for the supply of ammonia gas. Line 10 indicates an overflow discharging device for the ammoniated slurry leaving the installation.

Line 11 leads from ammoniation tank 7 to vacuum evaporator 12. Return line 13 leads from the vacuum evaporator 12 back to the ammoniation tank 7. Pump 14 may be provided in line 11 for forced circulation. Separator 16 is provided in line 15 leading from vacuum evaporator 12 to the vacuum source, line 17 leads from said separator 16 back to the vacuum evaporator 12. Potassium salts may be supplied through supply line 18 and other additives may be introduced into the ammoniation tank 7 through conveyor screw 19, the said screw being at the same time connected to line 11 through line 20 having valve 21 assembled therein.

Phosphate rock is acidulated in reaction tank 1 in the usual way with nitric acid and/or phosphoric acid. According to the invention the ammoniation of the acid solution is effected in a single step in tank 7, filled with neutralized slurry, by introducing ammonia, stirring intensively with agitator 8. The heat of reaction is removed by water evaporation. This is effected by recycling the ammoniated slurry through evaporator 12 and ammoniation tank 7 through lines 11 and 13.

The recycling portion of the slurry can be controlled by the pressure in the vacuum evaporator. Still more effective is forced circulation achieved by pump 14 as in that way any desired difference of temperature between the ammoniation tank 7 and vacuum evaporator 12 can be adjusted and the temperature of the ammoniation step in tank 7 can be regulated at will.

The potassium salts and other additives may be introduced entirely or partly by conveyor screw 19 into ammoniation tank 7. For better mixing and to avoid formation of dust a part of the recycling slurry may be branched off by valve 21 and introduced by duct 20 into conveyor screw 19.

Corresponding to the quantity of acid solution produced in acidulating tank 1 ammoniated slurry flows continuously out of ammoniator 7 through overflow duct 10.

EXAMPLE 1

Per hour 1660 kg. of a phosphate rock (34% $P_2O_5$) are acidulated with a mixture of 4460 kg. of nitric acid (60% $HNO_3$) and 2540 kg. of phosphoric acid (30% $P_2O_5$) in tank 1, thereby producing an acidulated solution containing 39% of water. The acid solution and 3560 kg. of potassium chloride are introduced continuously into the ammoniated slurry in tank 7. The slurry in tank 7 is kept at pH 5.5–6.5 by introducing 860 kg. of gaseous ammonia while stirring intensively, whereas the temperature is adjusted at 80° C. by recycling the slurry through vacuum evaporator 12. Thus a slurry containing 18–20% of water is attained. This slurry is granulated by mixing with recycle from the screens, as well known in granulating techniques, dried in a drying drum and screened. The complex fertilizer produced in this way contains 13% N, 13% $P_2O_5$ and 21% $K_2O$. Its $P_2O_5$ content is practically completely soluble in neutral ammonium citrate solution and to 41% in water.

EXAMPLE 2

2088 kg. of phosphate rock per hour containing 34% $P_2O_5$ are acidulated with a mixture of 3395 kg. of 60% nitric acid and 2738 kg. of phosphoric acid with 30% $P_2O_5$. The acid solution is introduced continually into the ammoniation tank 7. By the introduction of 667 kg. of ammonia per hour and recycling the slurry through the vacuum evaporator 12 a pH of 5.5–6.5 and a temperature of 100° C. is maintained. The slurry flowing off is continually mixed with 3390 kg. of potassium chloride and 600 kg. of kieserite per hour and is in usual manner mixed with the recycled dry material, granulated, dried and screened.

The complex fertilizer thus obtained contains 10% N, 15% $P_2O_5$, 20% $K_2O$, 2% MgO.

EXAMPLE 3

2643 kg. of ground phosphate rock with 34% $P_2O_5$ are acidulated hourly with a mixture of 6905 kg. of 60% nitric acid and 3808 kg. of phosphoric acid with 30% $P_2O_5$ in reactor 1. The acid solution flows continuously into the neutralized slurry in the ammoniation tank 7 into which at the same time 1311 kg. of ammonia are introduced. The slurry is vigorously stirred and set in circulation through the vacuum evaporator 12. The pH is kept at 5.5–6.5 and the temperature at 95° C. There is formed a fertilizer slurry which after mixing with recycled dry material, granulation, drying and screening leads to a fertilizer containing 20% N and 20% $P_2O_5$.

Preferably, the pressure in vacuum evaporator 12 may be chosen to be between 0.2 and 0.9 atm.

To maintain the desired pH between 5.5 and 6.8 the quantity of acid solution supplied per second should be comparatively small relative to the content of the ammoniation tank 7 and the quantity of neutralized slurry therein. The said tank should have a capacity 500 to 5000 times as much as the volume of the acid solution supplied per second, i.e. expressed in actual figures: On supply of 5 to 10 l. of acid solution per second the capacity of the ammoniation vessel is 2.5 to 25 m.³.

The phosphate used in the examples was Florida pebble phosphate.

The term "recycled dry material" as used in the examples are the over-size and fines which are separated from the on-size ready product by screening the dried granulated material.

We claim:

1. A method for the production of complex fertilizers comprising reacting phosphate rock with an acid selected from the group consisting of phosphoric acid, nitric acid and mixtures thereof in an acidulation zone, continuously passing part of the charge contained in said acidulation zone into a single stage ammoniation zone, adding to said acidulated mixture in said ammoniation zone at least 80 percent of the ammonia required for total ammoniation of said mixture, thereby evaporating water by the heat of neutralization to a water content of the ammoniated mixture not exceeding about 20 percent, maintaining in said ammoniating zone a pH between 5.5–6.8 and a temperature of 70 to 110° C., continuously withdrawing part of said ammoniated mixture and processing the same to complex fertilizer, and continuously recycling the other part of said ammoniated mixture through a return line into said ammoniation zone in such an amount that the content of ammoniated mixture in said ammoniation zone is at least 500 times the amount of acidulated mixture supplied per second to said zone.

2. The method as claimed in claim 1, wherein sulfuric acid is an additional component of said acid.

3. The method as claimed in claim 1 comprising providing a vacuum vaporizer in said return line and adjusting the temperature in the ammoniating zone by means of the vacuum maintained in said vacuum vaporizer.

4. The method as claimed in claim 1 comprising adjusting the temperature in the ammoniating zone by means of the rate of recycling of said ammoniated mixture.

5. The method as claimed in claim 1 comprising introducing a potassium salt into said ammoniating zone.

References Cited

UNITED STATES PATENTS

| | | | |
|---|---|---|---|
| 1,849,988 | 3/1932 | Moore | 71—37 |
| 1,867,866 | 7/1932 | Ober et al. | 71—37 |
| 2,680,679 | 6/1954 | Harvey et al. | 71—37 |
| 2,783,140 | 2/1957 | Hignett et al. | 71—37 |
| 2,879,152 | 3/1959 | Coleman | 71—37 |
| 2,913,329 | 11/1959 | Geiersberger et al. | 71—43 |
| 3,130,033 | 4/1964 | Stephens | 71—43 |

DONALL H. SYLVESTER, *Primary Examiner.*

R. BAJEFSKY, *Assistant Examiner.*